Figure 1:
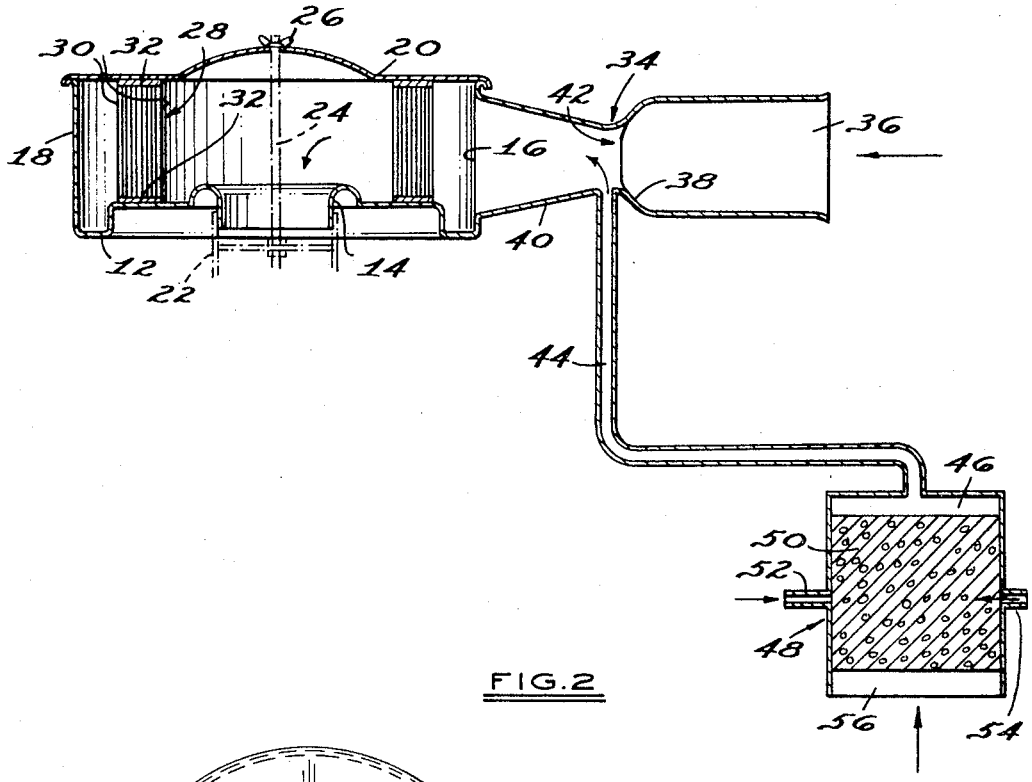
Figure 2:
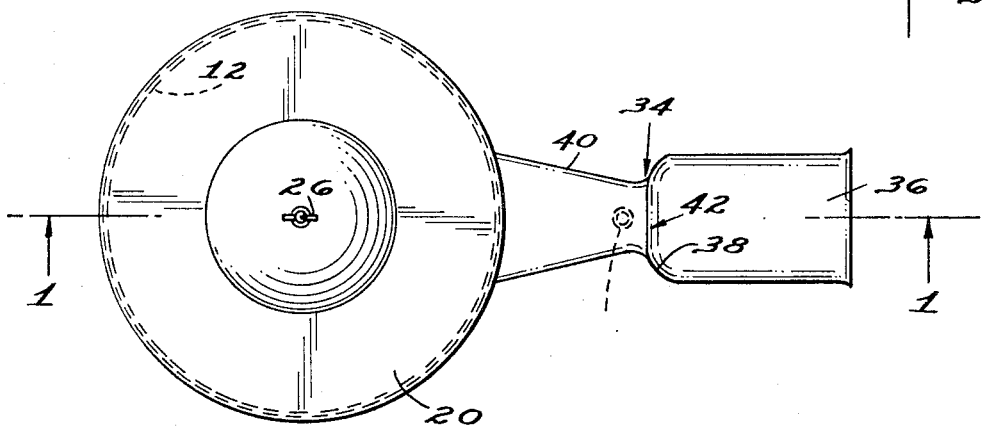

T861011

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 1, 1969

861 O.G. 19

775,389
AIR CLEANER FUEL VAPOR ASPIRATOR
Gunnar W. Hansen, 539 Marion St., Ypsilanti, Mich. 48197
Filed Nov. 13, 1968. Published Apr. 1, 1969
Class 55—261
1 Sheet Drawing. 6 Pages Specification

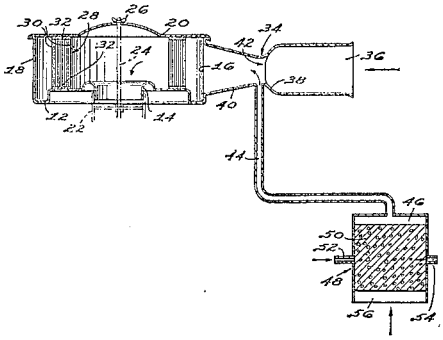

An internal combustion engine air cleaner has a snorkel like air inlet provided with aspirating means connected to a source of excess fuel vapors so that normal air flow into the air cleaner draws the excess fuel vapors therein to be burned in the engine combustion chambers.

T861011

April 1, 1969 G. W. HANSEN DEF. PUB.

AIR CLEANER FUEL VAPOR ASPIRATOR SN - 775389

Filed Nov. 13, 1968

INVENTOR.
GUNNAR W. HANSEN
BY John R. Faulkner
Robert B. McCollum
ATTORNEYS